(12) United States Patent
Heubner et al.

(10) Patent No.: US 6,203,632 B1
(45) Date of Patent: Mar. 20, 2001

US006203632B1

(54) OXIDATION-RESISTANT METAL FOIL, ITS USE AND METHOD FOR ITS PRODUCTION

(75) Inventors: Ulrich Heubner, Werdohl; Angelika Kolb-Telieps, Lüdensheid; Ralf Hojda, Altena, all of (DE)

(73) Assignee: Krupp VDM GmbH (DE)

( * ) Notice: Subject to any disclaimer, the term of this patent is extended or adjusted under 35 U.S.C. 154(b) by 0 days.

(21) Appl. No.: 09/319,146

(22) PCT Filed: Sep. 22, 1998

(86) PCT No.: PCT/EP98/06033

§ 371 Date: Jul. 1, 1999

§ 102(e) Date: Jul. 1, 1999

(87) PCT Pub. No.: WO99/18251

PCT Pub. Date: Apr. 15, 1999

(30) Foreign Application Priority Data

Oct. 2, 1997 (DE) .............................................. 197 43 720

(51) Int. Cl.⁷ .................................................... C22C 38/28
(52) U.S. Cl. ............................. 148/535; 148/609; 420/40; 420/62
(58) Field of Search ........................ 420/40, 62; 148/527, 148/531, 535, 609, 325

(56) References Cited

U.S. PATENT DOCUMENTS

| 4,414,023 | | 11/1983 | Aggen et al. . | |
|---|---|---|---|---|
| 4,870,046 | * | 9/1989 | Yamanaka et al. | 502/439 |
| 5,366,139 | | 11/1994 | Jha et al. . | |
| 5,411,610 | * | 5/1995 | Araki et al. | 148/325 |
| 5,476,554 | * | 12/1995 | Ishii et al. | 148/325 |
| 5,578,265 | * | 11/1996 | Ericson et al. | 420/40 |
| 5,620,651 | * | 4/1997 | Sikka et al. | 420/81 |
| 5,866,065 | * | 2/1999 | Herbelin et al. | 420/40 |

FOREIGN PATENT DOCUMENTS

| 0 387 670 B1 | 3/1990 | (EP) . |
|---|---|---|
| 402640 | 12/1990 | (EP) . |
| 475420 | 3/1992 | (EP) . |
| 573343 | 12/1993 | (EP) . |
| 516097 B1 | 8/1996 | (EP) . |
| 2224288 | 5/1990 | (GB) . |
| 3-36241 | 2/1991 | (JP) . |

* cited by examiner

Primary Examiner—George Wyszomierski
(74) Attorney, Agent, or Firm—Proskauer Rose, LLP

(57) ABSTRACT

The invention relates to iron-chromium aluminum metal foil which is resistant to high-temperature oxidation. Said metal foil is produced by hot-dip aluminizing an iron-chromium support band with an aluminum-silicon alloy. The foil has the following composition in weight percent: 18–25% Cr. 4–10% Al, 0.03–0.08% Y, max. 0.01% Ti, 0.01–0.05% Zr, 0.01–0.05% Hf, 0.5–1.5% Si. It also contains residual iron and impurities resulting from the method of production. The total aluminum content of the coated metal foil is at least 7% near the surface and not less than 3% further inside.

8 Claims, No Drawings

OXIDATION-RESISTANT METAL FOIL, ITS USE AND METHOD FOR ITS PRODUCTION

FIELD OF THE INVENTION

The present invention relates to a method for the production of an iron-chromium-aluminum metal foil which is resistant to high-temperature oxidation.

BACKGROUND OF THE INVENTION

U.S. Pat. No. 4,414,023 describes steel with 8.0–25.0% Cr, 3.0–8.0% Al, 0.002–0.06% Se, max. 4.0% Si, 0.06–1.0% Mn, 0.035–0.07% Ti, 0.035–0.07% Zr, including unavoidable impurities.

EP-A 0 387 670 discloses an alloy with 20–25% Cr, 5–8% Al, max. 0.01% P, max 0.01% Mg, max 0.5% Mn, max 0.005% S, rest Fe, including unavoidable impurities to which additional alloy elements such as 0.03% Y, 0.004% N, 0.02–0.04% C, 0.035–0.07% Ti, 0.035–0.07% Zr and 0.035–0.14% Hf are added if necessary.

The above-mentioned documents are however based on traditional production methods, i.e. conventional casting of the alloy and subsequent hot and cold forming. The disadvantage must then be accepted that iron-chromium-aluminum alloys are difficult to produce in conventional rolling and annealing processes, and that this disadvantage is all the more decisive as the aluminum contents are increased. With aluminum contents of more than 6%, the problems involved in these processes become so great that processing these alloys on a mass production scale is practically no longer possible, so that alloys with such high contents in aluminum have not even been offered on the market until now. Higher proportions of aluminum are however unavoidable in these production processes in order to further improve the resistance to oxidation or to increase electric resistance, as is necessary for certain applications.

In order to eliminate these disadvantages, U.S. Pat. No. 5,336,139 discloses a process in which foils of iron-chromium-aluminum alloys are produced by coating a suitable iron-chromium steel with aluminum or aluminum alloys on both sides by the roll-bonding method. This combination is exclusively cold-rolled and is finally diffusion-annealed so that a homogenous structure is produced. The core material may consist of the special steel AISI 434, possibly with the addition of Ce and La.

EP-B 0 204 423 describes another manner of producing multi-layer metal foils, i.e. through fire aluminizing. This patent is however based on an iron-chromium alloy without reactive addition. It has been found however, as described in further below in Example 2, that such materials are insufficient for application as catalytic converters because the are not sufficiently resistant to oxidation. To be used as catalytic converters, additions of reactive elements are absolutely necessary. This patent furthermore mentions that aluminum alloys containing silicon have not yielded satisfactory results for practical applications.

EP-B 0 516 097 discloses a Fe—Cr—Al scale-resistant alloy with additions of La, Y and Hf which can be produced through coating, in particular by the roll-bonding method.

DE-A 36 21 569 relates to the production of a chromium-aluminum-iron alloy to be used as a support material for catalytic converters, whereby the alloy contains 10–61% in weight of chromium, 6–25% in weight of aluminum and 0.001–1.0% in weight of each of several life-increasing additions.

The alloy is produced in the form of ribbon by rapid-quenching the melt on a moving cooling surface in such manner that a ribbon with a final thickness between 10 and maximum 60 $\mu$ is produced directly, i.e. without any additional forming process. It is a disadvantage that no coating of a support ribbon takes place, so that plane errors are produced in the ribbon due to the direct casting and cooling method in producing the final thickness, resulting in production problems in case that the ribbon is then made into catalytic converter supporting structures.

EP-A 402 640 as well as EP-A 497 992 disclose stainless steel foils for vehicle catalytic converter supports. Here too, no supporting ribbon is coated, but the stainless steel melt is produced directly with a thickness of less than 0.2 mm by means of rapid quenching, and this is followed by a cold rolling process of these cast foils. The Al contents should be between 1.0 and 20% in weight, while chromium content between 5 and 30% in weight is provided.

It is the object of the present invention to present a process for the production of an iron-chromium-aluminum metal foil, whereby the alloy has improved oxidation resistance in the temperature range of 1,100° C. that is better than for conventional alloys. It should furthermore be possible to produce the material at low cost and it is to be suitable for use in a number of construction components in high-temperature applications.

SUMMARY OF THE INVENTION

This object is attained by a process for the production of an iron-chromium-aluminum metal foil which is resistant to high-temperature oxidation, which is produced by fire-aluminizing an iron-chromium supporting ribbon with an aluminum-silicon alloy, whereby the foil is composed as follows (in mass %)

18–25% Cr
4–5% Al
0.03–0.08% Y
max. 0.01% Ti
0.01–0.05% Zr
0.01–0.05% Hf
0.5–1.5% Si Residual iron and impurities resulting from the method of production, with the total aluminum content of the coated metal foil is at least 7% at or near the surface and does not drop below 3% on the inside.

Advantageous further developments of the process according to the invention are to be derived from the appertaining sub-claims.

DETAILED DESCRIPTION OF THE INVENTION

The metal foil according to the invention can be obtained e.g. by means of block casting or, even more economically by means of continuous casting, and subsequent hot and cold forming. This ribbon is coated on either side to a thickness from 0.5 to 2 mm with a coating consisting of aluminum with 8–13% silicon. The coating is applied by means of fire aluminizing. The composite thus produced is preferably cold-rolled into a foil with at least one intermediate annealing, and then still meets the mechanical conditions for the further processing steps, such as corrugation which is necessary in the production of catalytic converters.

A subsequent or closing heat treatment is carried out advantageously at temperatures between 700 and 1,200° C., whereby a further development which is economically advantageous consists in the fact that the heat treatment takes place in form of the known diffusion annealing after final forming of the end products produced from the metal composite foil and which takes place "in situ", i.e. after the completion of the catalytic converter installation, or only on the completed support of the catalytic converter. For certain other applications, e.g. for utilization as heating element, the diffusion annealing is effected directly on the foil.

Surprisingly this leads to a significant improvement to resistance to oxidation, especially in case of high temperature applications. It is especially important to select the type of reactive additions. As described earlier, the type of additions are important on the one hand, and their upper limits on the other hand. Thus 0.08% in mass of Y should not be exceeded under any circumstances. Silicon additions are also significant in the coating, because they have a positive influence on the diffusion behavior as desired.

When applying intermediate annealing, changes below 0.5% in the dimension of a sheet made of this material can be achieved in the end thickness, also during final annealing steps at approximately 1,150° C.

If intermediate annealing is applied to the composite, temperature and holding time should be selected so that the rolling on the end thickness is possible without any problems, i.e. the occurrence of intermetallic phases must be repressed as much as possible. On the other hand, such intermediate annealing can be used to allow part of the aluminum to be diffused into the supporting ribbon. Surprisingly this results in the advantage that the change in volume can be reduced considerably during heat treatment on the end thickness.

Another advantageous embodiment of the invention consists in further alloying the iron-chromium-aluminum alloy described above by means of further coating with aluminum and silicon, and thus to increase its resistance to oxidation as well as its electric resistance. This is also possible if a supporting ribbon is used which already contains up to 6% aluminum, and then requires only a thinner coating.

The object of the invention is explained in further detail through the examples below, whereby examples 1 and 2 are merely comparison examples pertaining to the object of the invention.

EXAMPLE 1

The following alloy was obtained by melting and was treated in a conventional manner by rolling and annealing in the following mass percentages:
20.45% Cr
0.20% Si
0.05% Hf
0.02% Zr
<0.01% Ti
5.55% Al
0.06% Y Its oxidation behavior was examined following aging at 1,100° C. and was compared with that of an alloy with additions of rare earths, whereby a change in mass that was by 20% less was found in the material with additions of Y and Hf.

If it is compared with an alloy which contains Y but also Ti and no additions of Hf, its mass change is also 10% more than in the alloy with additions of rare earths.

From these tests, it appears that the composition shown in Example 1 is clearly superior to the other, more current alloys with respect to its resistance to oxidation as well as for application in the field of catalytic converters and heating conductors.

EXAMPLE 2

A support material with the following composition in mass percentages:
15.91% Cr
<0.01% Y
<0.01% Zr
<0.01% Hf
with residual iron and impurities resulting from the method of production was produced by means of fire aluminizing with
3.8 Al and 0.4% Si
and was formed into a foil by means of rolling and was finally diffusion-annealed. After 400 hours aging at 1,100° C. the support material had a mass increase that was 10 times greater as compared to a comparison alloy with additions of Se, and had a length increase by a factor of approximately 2.

EXAMPLE 3

The alloy was produced by means of fire aluminizing and has the following chemical composition (in mass percentages):
18.35% CR
0.59% Si
5.4% Al
0.03% Zr
0.04% Y
0.05% Hf
and containing residual iron and impurities resulting from the method of production was diffusion-annealed at 1,100° C. and its aluminum distribution over the ribbon thickness was then as follows:

At the surface 10% in mass was determined to be aluminum, at 5 $\mu$ beneath the surface approximately 5% and inside the ribbon 3.5%.

This has an especially advantageous effect on the resistance to oxidation. The change in mass at 1,100° C. is 25% less than for a comparison alloy which was produced in the conventional manner, e.g. as described in Example 1. It is a further advantage that the production costs when fire aluminizing is used are only approximately 75% of the costs of conventional alloys.

EXAMPLE 4

From a ribbon produced according to Example 3, a strip was cut out at a thickness of 0.11 mm. Individual pieces were annealed at temperatures to be found in the tables below, and were then rolled to their final thickness of 50 $\mu$m. During the subsequent final annealing at 1,100° C. the length and width changed by less than 0.5%.

| Temperature of Intermediate annealing/° C. | Changes in Length or width/% |
| --- | --- |
| 800 | 0.3 |
| 900 | 0.2 |
| 1000 | 0.2 |

What is claimed is:
1. Process for the production of an iron-chromium-aluminum metal foil with great resistance to high-temperature oxidation, said process comprising:
fire aluminizing an iron-chromium supporting ribbon with an aluminum-silicon alloy, thereby producing a foil composed of the following (in % of mass):

18–25% Cr
4–10% Al
0.03–0.08% Y
max. 0.01% Ti
0–01–0.05% Zr
0.01–0.05% Hf
0.5–1.5% Si containing also residual iron and impurities resulting from the method of production, whereby the total aluminum contents of the coated metal foil at the surface is at least approximately 7% and does not drop below 3% towards the inside.

2. Process as in claim 1, further comprising the step of rolling the foil, wherein the step of rolling further comprises the step of annealing at approximately 800° C., such that a change in volume in a final annealing which follows the rolling process is reduced to $\leqq 0.5\%$.

3. Process as in claim 2, wherein the step of annealing is performed at 400° C. to 600° C.

4. Process as in claim 1, whereby the total aluminum content in proximity of the surface is at least approximately 10% and does not drop below 5% towards the inside.

5. Process as in claim 2, wherein following the step of rolling, a form body is produced, and a step of diffusion annealing is performed on the form body.

6. Iron-chromium-aluminum metal foil which is resistant to high-temperature oxidation, produced by fire aluminizing of an iron-chromium supporting ribbon with an aluminum-silicon alloy, whereby the composition of the foil, in mass percentages, is as follows:

18–25% Cr
4–10% Al
0.03–0.08% Y
Max. 0.01% Ti
0.01–0.05% Zr
0.01–0.05% Hf
0.5–1.5% Si with residual iron and impurities resulting from the method of production, whereby the total aluminum content of the coated metal foil is at least approximately 7% near the surface and does not drop below 3% towards the inside.

7. Metal foil as in claim 6, characterized in that the total aluminum content in proximity of the surface is at least 10% and does not drop below 5% towards the inside.

8. Metal foil as in claim 6, having an electrical resistance of more than 1.5 $\Omega mm^2/m$.

* * * * *